(12) United States Patent
Marinelli

(10) Patent No.: US 11,357,362 B2
(45) Date of Patent: Jun. 14, 2022

(54) DISPENSER UNIT FOR LIQUID PRODUCTS

(71) Applicant: LA BOTTEGA DELL'ALBERGO S.P.A., Trecastelli (IT)

(72) Inventor: Umberto Maria Marinelli, Senigallia (IT)

(*) Notice: Subject to any disclaimer, the term of this patent is extended or adjusted under 35 U.S.C. 154(b) by 67 days.

(21) Appl. No.: 16/962,615

(22) PCT Filed: Jan. 7, 2020

(86) PCT No.: PCT/EP2020/050184
§ 371 (c)(1),
(2) Date: Jul. 16, 2020

(87) PCT Pub. No.: WO2021/018416
PCT Pub. Date: Feb. 4, 2021

(65) Prior Publication Data
US 2022/0000320 A1    Jan. 6, 2022

(30) Foreign Application Priority Data

Jul. 29, 2019   (IT) .......................... 102019000013149

(51) Int. Cl.
*A47K 5/12*       (2006.01)
*F16B 21/06*      (2006.01)

(52) U.S. Cl.
CPC .......... *A47K 5/1205* (2013.01); *F16B 21/065* (2013.01); *A47K 2201/02* (2013.01)

(58) Field of Classification Search
CPC ...... A47K 5/12; A47K 5/1202; A47K 5/1204; A47K 5/1211; A47K 5/122; A47K 5/1205; A47K 2201/02; A47K 2201/025; F16B 21/065; B65D 23/003; B05B 15/62

USPC .......................... 222/180–181.3, 153.03, 325
See application file for complete search history.

(56) References Cited

U.S. PATENT DOCUMENTS

| | | | | |
|---|---|---|---|---|
| 4,164,306 A | * | 8/1979 | Perrin ....................... | A47K 5/12 141/375 |
| 4,886,192 A | * | 12/1989 | Cassia .................. | A47K 5/1209 222/181.2 |
| 5,226,625 A | * | 7/1993 | Hanna ...................... | A47K 5/12 248/222.13 |
| 5,413,251 A | * | 5/1995 | Adamson ............. | A47K 5/1211 222/129 |
| 5,421,489 A | * | 6/1995 | Holzner, Sr. ......... | A47K 5/1208 222/181.2 |
| 5,613,625 A | * | 3/1997 | Specht .................. | B65D 79/00 222/325 |

(Continued)

FOREIGN PATENT DOCUMENTS

| EP | 1325700 A1 | 7/2003 |
|---|---|---|
| GB | 2427120 A | 12/2006 |

OTHER PUBLICATIONS

International Search Report for corresponding PCT/EP2020/050184.
Written Opinion of the ISA for corresponding PCT/EP2020/050184.

*Primary Examiner* — Charles P. Cheyney
(74) *Attorney, Agent, or Firm* — Egbert, McDaniel & Swartz, PLLC

(57) ABSTRACT

A dispenser unit has a bottle suitable for containing a liquid product, a dispenser and a fixing system with a first plate suitable for being fixed to a wall, a second plate suitable for being fixed to the bottle in a recessed seat of the bottle and coupled with the first plate, and a key suitable for uncoupling the first plate from the second plate.

9 Claims, 7 Drawing Sheets

(56) References Cited

U.S. PATENT DOCUMENTS

| | | | | |
|---|---|---|---|---|
| 5,975,372 | A * | 11/1999 | Heyn | A47K 5/122 |
| | | | | 222/181.3 |
| 6,131,773 | A * | 10/2000 | Wade | A47K 5/1215 |
| | | | | 222/153.02 |
| 6,619,509 | B2 * | 9/2003 | DeKoning | A47K 5/12 |
| | | | | 222/183 |
| 2005/0077385 | A1 * | 4/2005 | Chen | A47K 5/12 |
| | | | | 239/302 |
| 2008/0029665 | A1 | 2/2008 | Bauer | |
| 2011/0259920 | A1 * | 10/2011 | Rennie | A47K 5/1205 |
| | | | | 222/165 |
| 2013/0092708 | A1 * | 4/2013 | Geiberger | A47K 5/1209 |
| | | | | 222/153.03 |
| 2015/0190827 | A1 * | 7/2015 | Ophardt | A47K 5/12 |
| | | | | 222/153.09 |
| 2016/0274596 | A1 * | 9/2016 | Buell | G05D 7/0676 |
| 2021/0321830 | A1 * | 10/2021 | Kilic | B05B 11/0038 |

* cited by examiner

DISPENSER UNIT FOR LIQUID PRODUCTS

The present patent application relates to a dispenser unit for liquid products, such as soap, detergent and the like.

Dispensers of liquid products are known on the market. Said dispensers comprise a bottle suitable for containing the liquid product and a dispenser applied to the bottle to dispense the liquid product.

The dispenser generally comprises a pump mechanism connected to a dispensing nozzle. The user presses the dispenser to actuate the pump mechanism that extracts the liquid product contained in the dispenser and dispenses the liquid product through the dispensing nozzle.

Said dispensers are generally used in bathrooms in order to dispense body cleansing products. Therefore, said dispensers are generally positioned on a sink or on a shelf used to support body cleansing products. Evidently, such a position of the dispensers involves some drawbacks in terms of space and handling, with the general risk of overturning the dispenser or causing its fall.

In order to solve such a drawback, at least partially, dispenser units are known which are provided with a fixing system wherein the bottle is fixed to a support that is fixed to the wall. However, said fixing systems of the dispensers according to the prior art are complicated, not versatile, cumbersome, unreliable and not aesthetically pleasing because the fixing support is visible. Moreover, after fixing the dispenser on the wall, it is extremely complicated, and almost impossible to replace or remove the bottle for introducing the liquid product.

The purpose of the present invention is to eliminate the drawbacks of the prior art by disclosing a dispenser unit for liquid products that is practical, versatile, reliable, easy to install, and suitable for replacing the bottle rapidly and easily.

These purposes are achieved according to the invention with the characteristics of the independent claim 1.

Advantageous embodiments of the invention appear from the dependent claims.

The dispenser unit for liquid products according to the invention is defined in claim 1.

Additional features of the invention will appear clearer from the following detailed description that refers to merely illustrative, not limiting embodiments, wherein.

Figure 1:
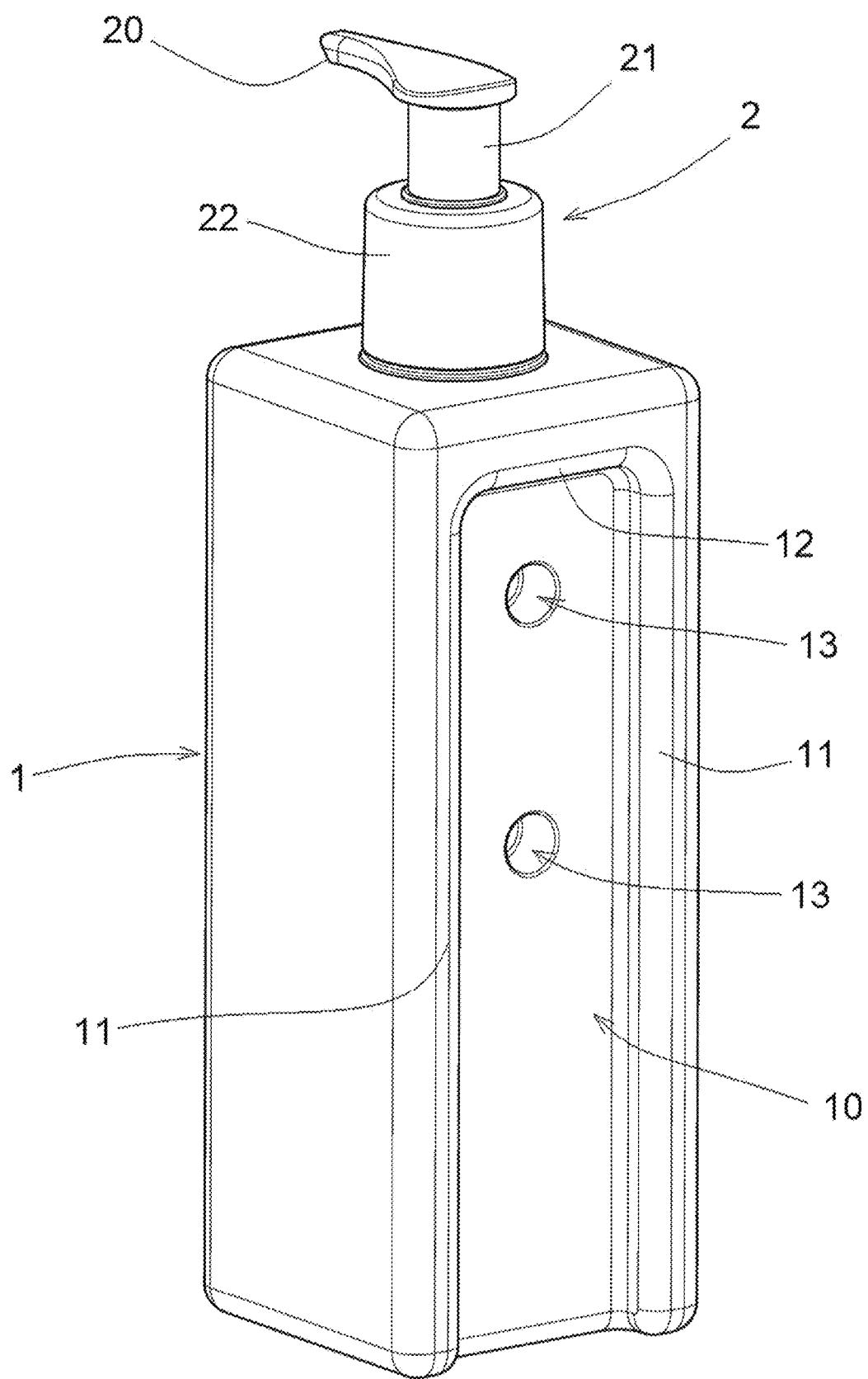
FIG. 1 is a perspective view of a bottle with dispenser of the dispenser unit according to the invention.

With reference to the Figures, the dispenser unit of the invention is described, which is generally indicated with reference numeral 100.

Figure 4:
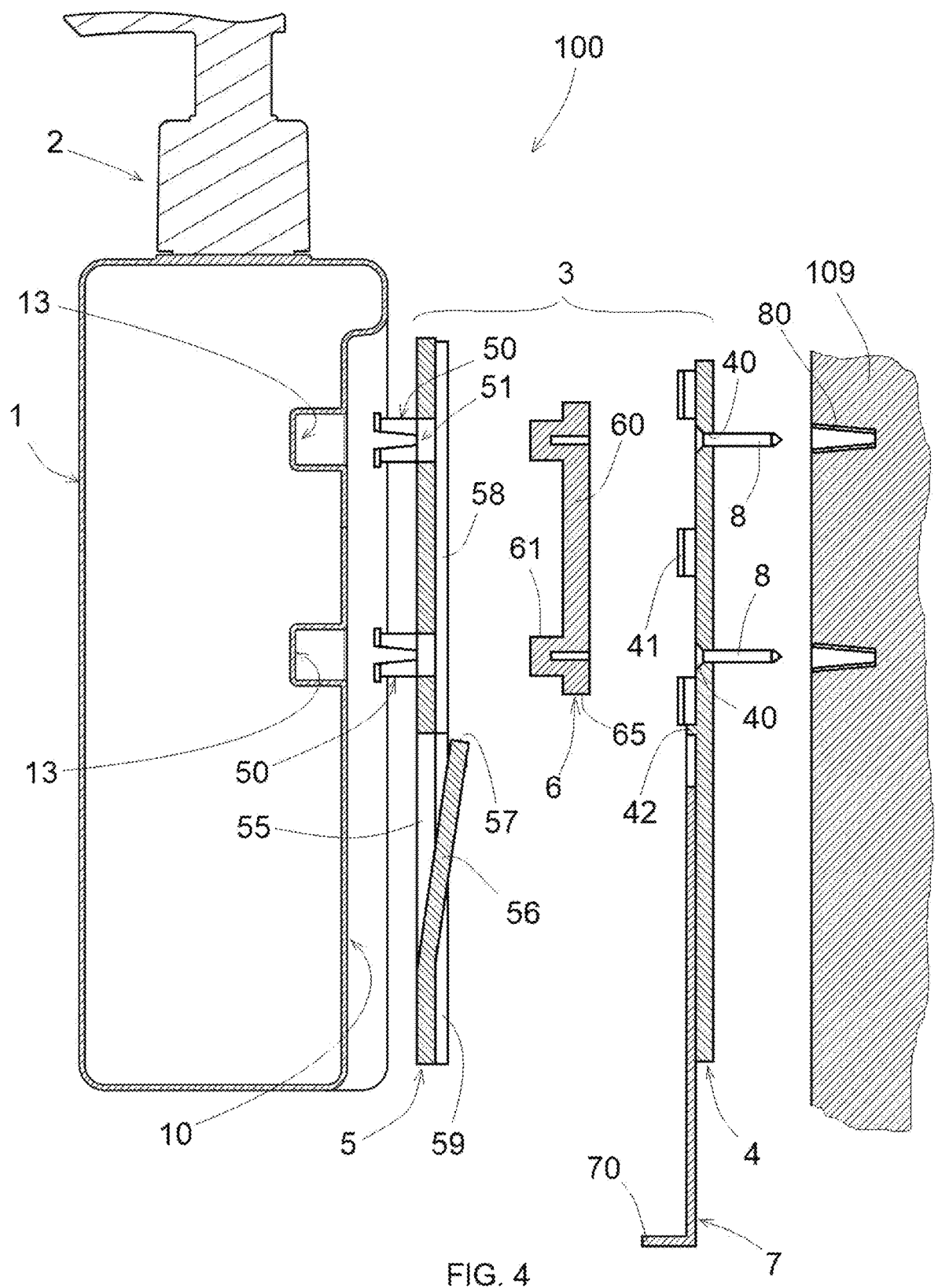
FIG. 4 is an exploded axial view of the dispenser unit according to the invention and of a portion of a wall where the dispenser unit is to be fixed.
Figure 5:
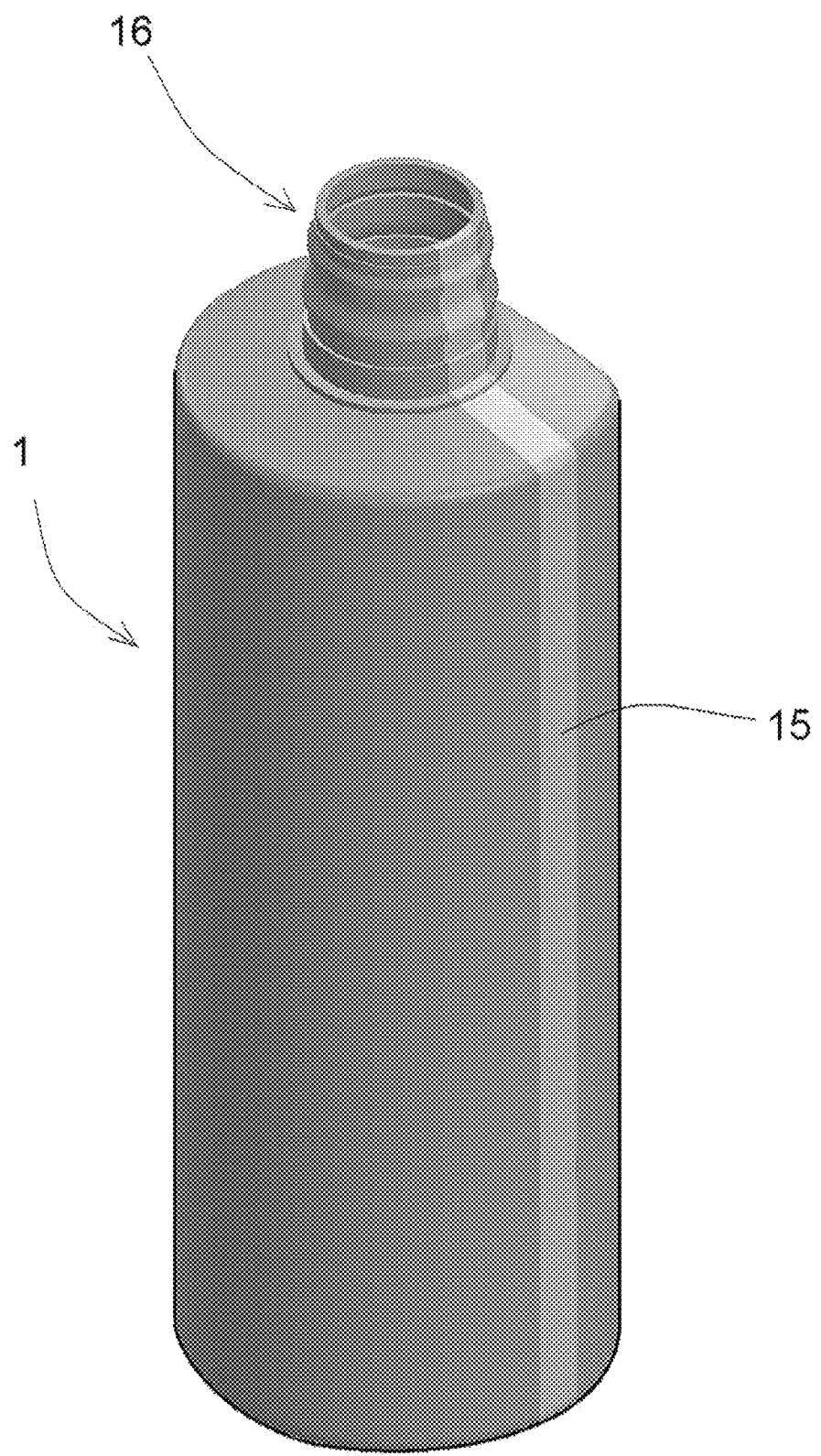
FIG. 5 is a perspective view of a second embodiment of a bottle of the dispenser unit.
Figure 6:
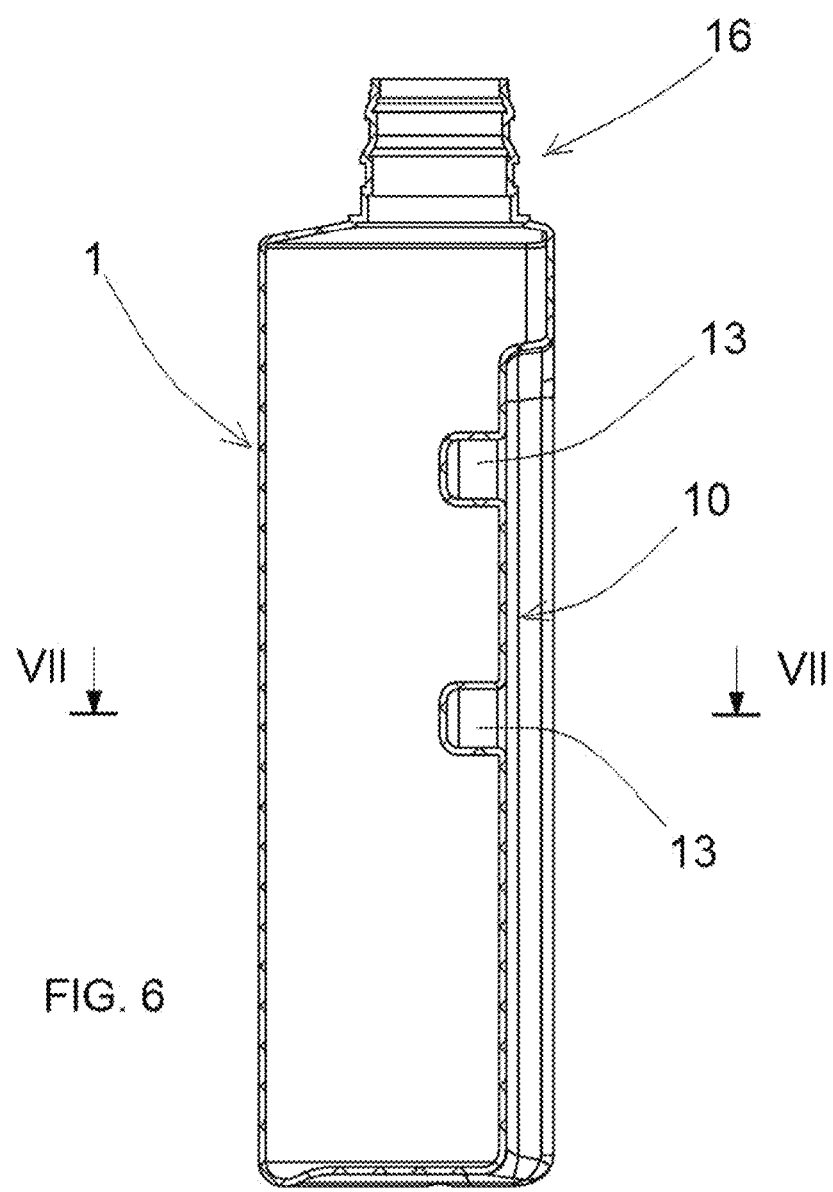
FIG. 6 is an axial sectional view of the bottle of FIG. 5.
Figure 7:
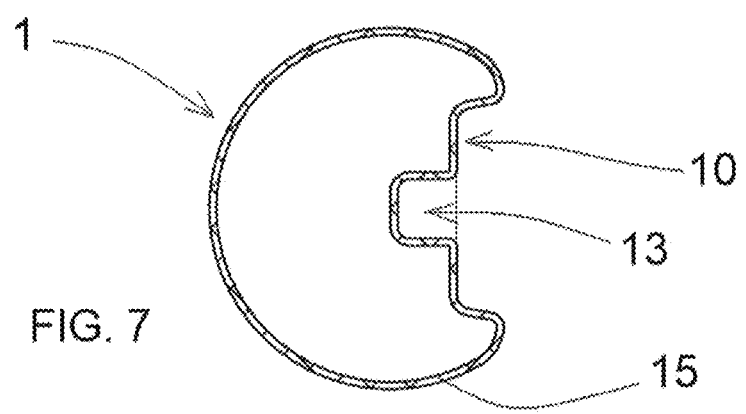
FIG. 7 is a cross-sectional view of the bottle taken along the cross-sectional plane VII-VII of FIG. 6.

With reference to FIG. 4, the dispenser unit (100) comprises:
a bottle (1) suitable for containing a liquid product,
a dispenser (2) applied on the bottle (1) to dispense the liquid product, and
a fixing system (3) suitable for fixing the bottle (1) to a wall (109).

With reference to FIG. 1, the bottle (1) has a recessed seat (10) that extends in longitudinal direction. The recessed seat (10) is open on the bottom and is defined by an overturned-U profile with two longitudinal ribs (11) that are joined by an upper transverse rib (12).

The recessed seat (10) is provided with two blind holes (13) that extend radially towards the interior of the bottle (1).

The blind holes (13) are disposed along a longitudinal axis that passes through a center line of the recessed seat (10).

The dispenser (2) is applied on a neck of the bottle and is known in the prior art, therefore omitting its detailed description. The dispenser (2) comprises a dispensing nozzle (20) mounted on a piston (21) that slides in a cylinder (22) wherein a pump mechanism is disposed and connected to a tube that draws in the bottle. The compression of the piston (21) inside the cylinder (22) actuates the pump mechanism that extracts the liquid product contained in the bottle and dispenses the liquid product through the dispensing nozzle (20).

Figure 2:
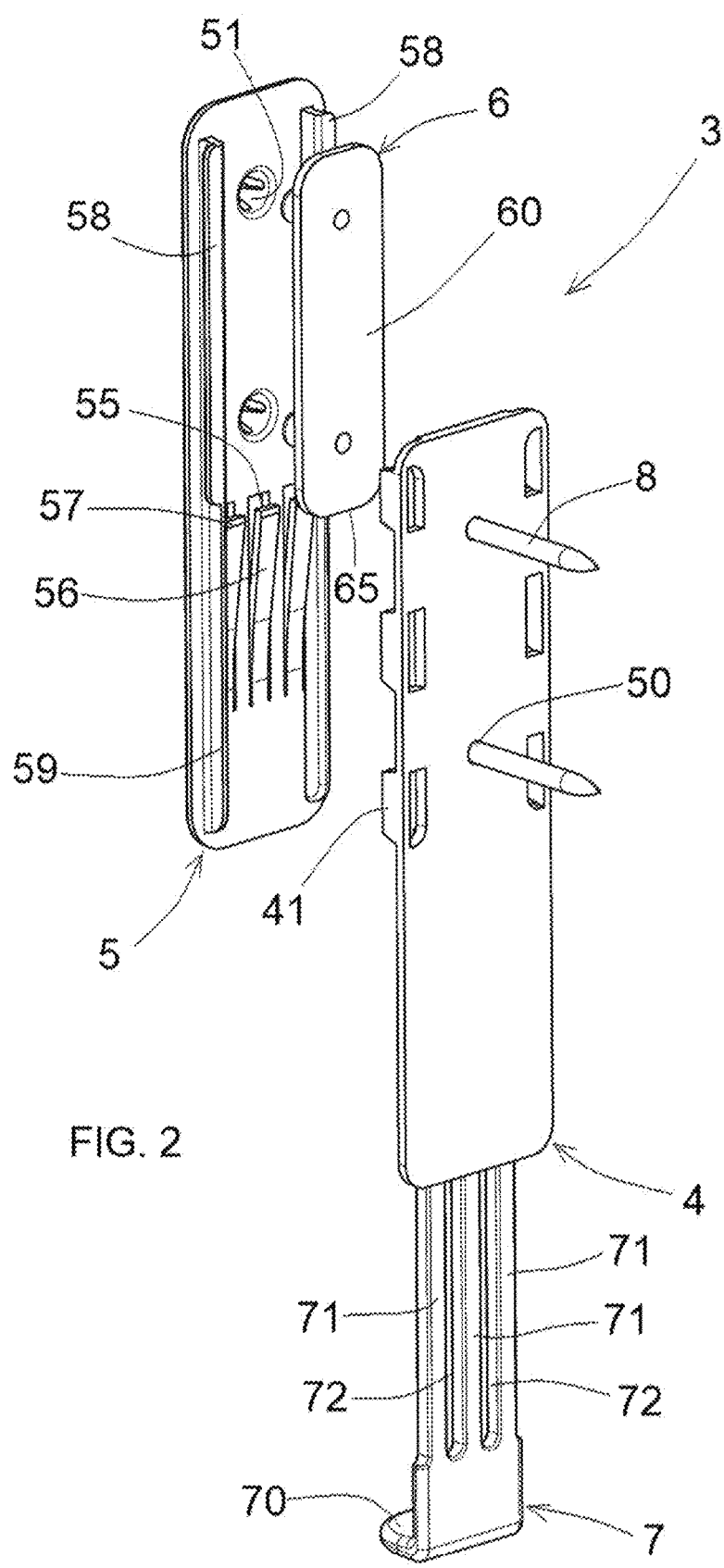
FIG. 2 is an exploded perspective view of a fixing system of the dispenser unit according to the invention.
Figure 3:
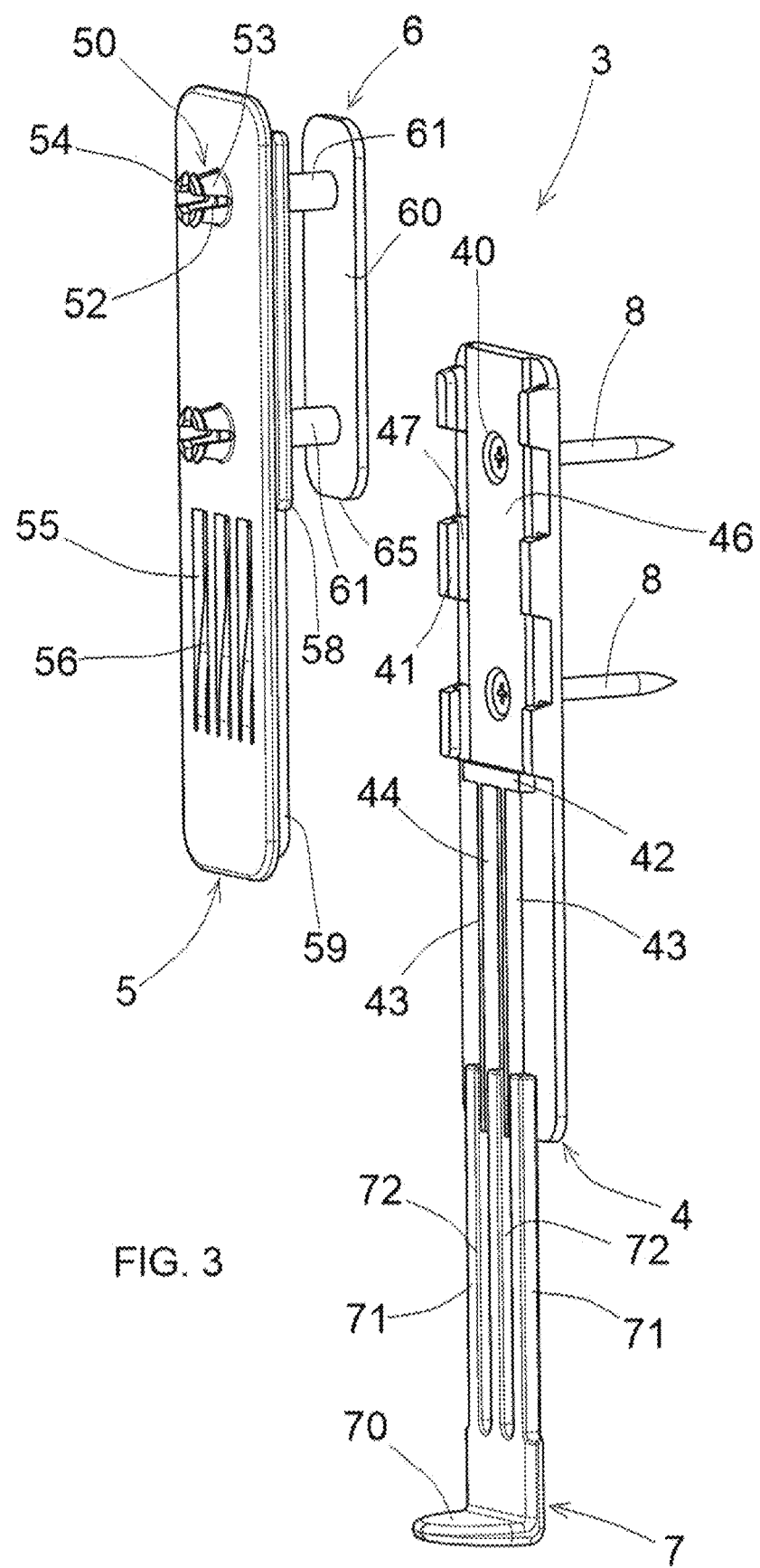
FIG. 3 is a perspective view of the fixing system of FIG. 2 rotated by 180°.

With reference to FIGS. 2, 3 and 4, the fixing system (1) comprises:
a first plate (4) suitable for being fixed to the wall (109),
a second plate (5) suitable for being fixed to the bottle (1) and coupled with the first plate (4), and
a key (7) suitable for uncoupling the first plate (4) from the second plate (5).

The fixing system (3) can also comprise a blocking device (6) applied to the second plate (5) for firmly blocking the second plate (5) to the bottle (1).

The first plate (4) has two through holes (40) crossed by screws (8) that are screwed into screw anchors (80) disposed on the wall (109).

The first plate (4) has guide tracks (41) that protrude frontally and longitudinally from lateral edges of the first plate. The first plate (4) has a central portion (46) that protrudes in the back and is disposed between the guide tracks in such a way to define lateral guide grooves (47) between the central portion (46) and the guide tracks (41).

The guide tracks (41) of the first plate have an L-shaped cross-section.

The guide tracks (41) of the first plate extend from an upper end of the first plate to approximately half height of the first plate. The guide tracks (41) of the first plate end in correspondence of a transverse rib (42) disposed at approximately half of the height of the first plate (4). The transverse rib (42) protrudes in the back of the first plate.

Longitudinal ribs (43) extend under the transverse rib (42). For example, two longitudinal ribs (43) are provided in parallel position and are spaced out in such a way to define a longitudinal groove (44).

The second plate (5) comprises two fixing pins (50) suitable for engaging in the blind holes (13) of the bottle. The second plate (5) is disposed in the recessed seat (10) of the bottle and the fixing pins (50) protrude orthogonally and frontally from the second plate (5) for engaging in the blind holes (13) of the bottle.

Each fixing pin (50) of the second plate has a cylindrical or truncated-conical shape with a through hole (51) and a plurality of notches (52) that define a plurality of flexible ends (53). Each flexible end (53) of the fixing pin has a retention tooth (54) that protrudes outwards. For illustrative purposes, each fixing pin (50) has four flexible ends (53) disposed in diametrically opposite positions.

Longitudinal slots (55) are obtained in the second plate (5) under the lower fixing pin.

A longitudinal flexible tab (56) is disposed inside each longitudinal slot (55) in inclined position relative to the second plate, in such a way to protrude in the back from the second plate. The longitudinal flexible tabs (56) have a stop end (57) that protrudes in the back from the second plate in order to be stopped against the transverse rib (42) of the first plate.

For illustrative purposes, the second plate (5) comprises three longitudinal slots (55), wherein corresponding longitudinal flexible tabs (56) are disposed.

Two guide tracks (58) protrude longitudinally in the back from the second plate, near the lateral edges of the second plate, in such a way to define a longitudinal seat between them. The guide tracks (58) of the second plate have an L-shaped cross-section.

The guide tracks (58) of the second plate are complementary to the guide tracks (41) of the first plate. In view of the above, the guide tracks (58) of the second plate are slidingly engaged with the guide tracks (41) of the first plate and the second plate (5) can slide longitudinally on the first plate (4), preventing a removal of the second plate in an orthogonal or oblique direction relative to the wall (109).

The guide tracks (58) of the second plate extend from an upper end of the second plate to approximately half height of the second plate. The guide tracks (58) of the second plate continue with longitudinal ribs (59) that extend until a lower end of the second plate.

The blocking device (6) comprises a plate (60) that is suitably dimensioned to be disposed in the seat of the second plate (5) between the guide tracks (58) of the second plate. The blocking device (6) comprises two pins (61) that protrude frontally from the plate (60) in order to be engaged in the holes (51) of the fixing pins (50) of the second plate, in such a way to diverge the flexible tabs (53) of the fixing pins of the second plate that are held inside the blind holes (13) of the bottle.

When it is disposed between the first plate (4) and the second plate (5), the blocking device (6) ensures an expansion of the fixing pins (50) of the second plate inside the blind holes (13) of the bottle, firmly fixing the second plate to the bottle.

The plate (60) of the blocking device has a lower edge (65) suitable for being stopped against the transverse rib (42) of the first plate in order to prevent a translation of the second plate on the first plate from up downwards.

The key (7) has a lower end that is bent with an L-shape and defines a handle (70) suitable for being held by the user.

The key (7) is shaped like a comb with prongs (71) that extend in upper position. Longitudinal slots (72) are defined between the prongs (71). In view of the above, the key (7) can be inserted from below between the first plate (4) and the second plate (5). The longitudinal ribs (43) of the first plate are disposed in the slots (72) between the prongs (71) of the key and the key can be slidingly guided in longitudinal direction on the first plate (4).

It must be noted that the prongs (71) of the key are in correspondence of the longitudinal flexible tabs (56) of the second plate. Therefore, when the key (7) slides upwards in longitudinal direction, the prongs (71) of the key push the longitudinal flexible tabs (56) of the second plate, which are bent and return inside the slots (45) of the second plate.

This description continues by illustrating the mounting of the dispenser unit (100).

Holes are drilled in the wall (109), wherein the screw anchors (80) are inserted.

The first plate (4) is fixed to the wall (109) by means of the screws (8) that are screwed in the anchor screws (80) that are expanded and held in the hole of the wall.

The second plate (5) is fixed to the bottle (1), inserting the fixing pins (50) of the second plate in the blind holes (13) of the bottle.

The second plate (5) is fixed to the bottle by engaging the pins (61) of the blocking device inside the holes (51) of the fixing pins of the second plate.

The operator grabs the bottle (1) and moves it in such a way that the second plate (5) slides from up downwards on the first plate (4). During such a mounting step, the longitudinal flexible tabs (56) of the second plate slide on the transverse rib (42) of the first plate and are elastically bent inside the longitudinal slots (55) of the second plate, until the stop end (57) of the longitudinal flexible tabs (56) of the second plate passes beyond the transverse rib (42) of the first plate.

When the stop end (57) of the longitudinal flexible tabs (56) of the second plate passes beyond the transverse rib (42) of the first plate, the longitudinal flexible tabs (56) are elastically ejected outwards and the stop end (57) of the longitudinal flexible tabs (56) of the second plate protrudes with respect to the second plate. Consequently, the bottle (1) can no longer translate upwards because the stop ends (57) of the longitudinal flexible tabs (56) of the second plate are stopped against the transverse rib (42) of the first plate.

Moreover, the bottle (1) can no longer translate downwards because the lower edge (65) of the plate (60) of the blocking device (6) is stopped against the transverse rib (42) of the first plate. The bottle cannot be extracted in an orthogonal or oblique direction relative to the wall (109) because the coupling between the guide tracks (41) of the first plate and the guide tracks (58) of the second plate prevents such a type of extraction.

Therefore the bottle is firmly fixed to the wall (109). It must be considered that the fixing system (3) is not visible because it is disposed in the recessed seat (10) of the bottle.

In order to remove the bottle (1) from the wall (109), the operator grabs the handle (70) of the key and inserts the key (7) from down upwards between the first plate (4) and the second plate (5). The prongs (71) of the key push the longitudinal flexible tabs (56) of the second plate, which are elastically returned inside the slots (45) of the second plate. Therefore, the stop ends (57) of the longitudinal flexible tabs (56) of the second plate are no longer stopped against the transverse rib (42) of the first plate. Consequently, the bottle (1) can be extracted upwards because the second plate (5) is free to slide upwards on the first plate (4).

FIGS. 1 to 8 illustrate a second embodiment of the bottle (1). In such a case, the bottle (1) has a longitudinal band (15) made of a transparent or translucent material that lets the user see the product inside the bottle. In view of the above, the user can check the level of the liquid product and replace or refill the bottle when the liquid product is about to finish.

Figure 8:
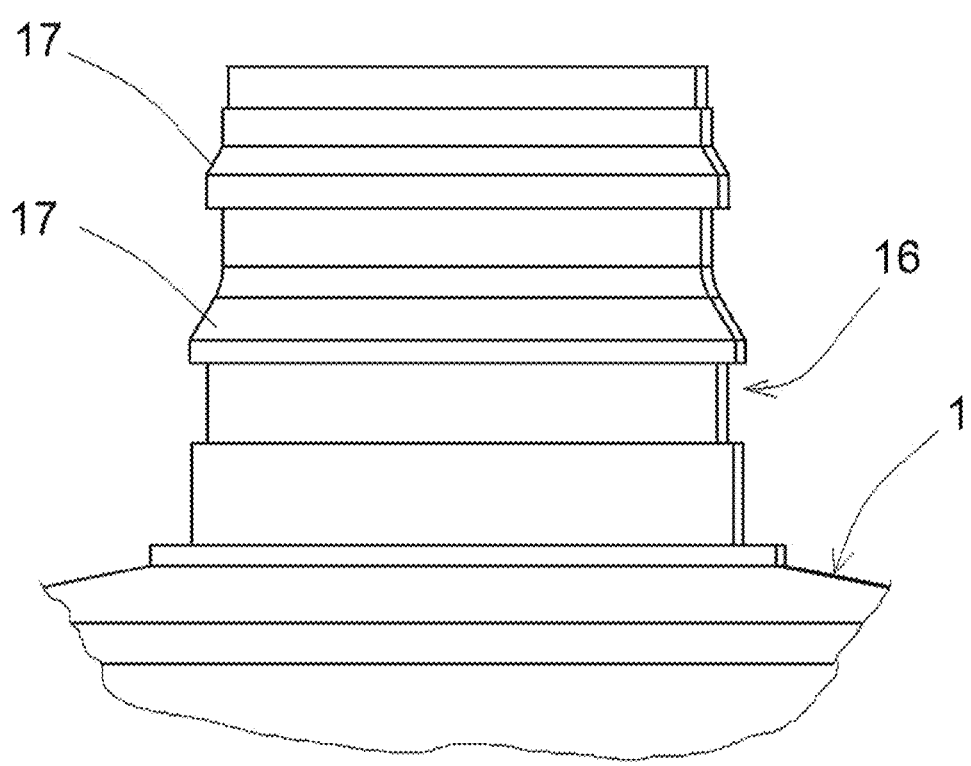
FIG. 8 is an enlarged front view of a neck of the bottle of FIG. 5.

With reference to FIG. 8, the bottle has a neck (16) provided with at least one collar (17) that protrudes outwards for coupling the dispenser (2). The collar (17) can have a truncated-conical shape with a tapered surface with decreasing diameter going from up downwards.

Numerous equivalent variations and modifications can be made to the present embodiments of the invention, which are within the reach of an expert of the field and fall in any case within the scope of the invention as disclosed by the appended claims.

The invention claimed is:

1. A dispenser unit comprising:
a bottle adapted to contain a liquid product, said bottle having a recessed seat that is open on a bottom thereof and extends in a longitudinal direction, said bottle having at least one blind hole formed in the recessed seat and extends radially toward an interior of said bottle;
a dispenser applied to said bottle and adapted to dispense the liquid product; and
a fixing system adapted to fix said bottle to a wall, said fixing system comprising:
a first plate adapted to be fixed to the wall;
a second plate fixed to said bottle in the recessed seat, said second plate being coupled to said first plate, said second plate having at least one fixing pin engageable with the blind hole of said bottle; and
a key adapted to uncouple said first plate from said second plate.

2. The dispenser unit of claim 1, further comprising:
a blocking device applied to said second plate so as to fix said second plate to said bottle.

3. The dispenser unit of claim 2, wherein the at least one fixing pin of said second plate has a cylindrical or a truncated-conical shape with a through hole and a plurality of notches that define a plurality of flexible tabs with a retention tooth that projects outwardly.

4. The dispenser unit of claim 3, wherein said blocking device has a plate and at least one pin that protrudes frontally from the plate of said blocking device, the at least one pin being engaged in the through hole of the at least one fixing pin of said second plate so as to diverge the plurality of flexible tabs of the at least one fixing pin.

5. The dispenser unit of claim 1, wherein said first plate has guide tracks that protrude frontally and longitudinally from a lateral edge of said first plate, said second plate having guide tracks that protrude in a back of and longitudinally from said second plate adjacent to lateral edge of said second plate, wherein the guide tracks of said second plate are slidingly engaged with guide tracks of said first plate, the guide tracks of said second plate being complementary to the guide tracks of said first plate such that said second plate is longitudinally slidable on said first plate so as to prevent a removal of said second plate in an orthogonal or oblique direction relative to the wall.

6. The dispenser unit of claim 5, wherein the guide tracks of said first plate and the guide tracks of said second plate have an L-shaped cross-section.

7. The dispenser unit of claim 2, wherein said first plate has a transverse rib that protrudes at a back of said first plate, the second plate having at least one longitudinal slot and at least one longitudinal flexible tab disposed inside the at least one longitudinal slot in an inclined orientation relative to said second plate, the at least one longitudinal flexible tab having a stop end that protrudes at a back of said second plate so as to be stopped against the transverse rib of said first plate so as to prevent an upward and downward translation of said second plate relative to said first plate, said key having at least one prong that pushes the at least one longitudinal flexible tab of said second plate inside the at least one longitudinal slot of said second plate such that the stop end of the at least one longitudinal flexible tab is not stopped against the transverse rib of said first plate so that said second plate can translate upwardly and downwardly on said first plate.

8. The dispenser unit of claim 7, wherein said first plate has at least two longitudinal ribs that define at least one groove in which the prong is guided.

9. The dispenser unit of claim 8, wherein said blocking device has a plate with a lower edge that is stoppable against the transverse rib of said first plate so as to prevent an upward and downward translation of said second plate on said first plate.

* * * * *